United States Patent
Heaney

(10) Patent No.: US 10,575,671 B2
(45) Date of Patent: Mar. 3, 2020

(54) EGG WHITE MOLD

(71) Applicant: Danielle Heaney, Secaucus, NJ (US)

(72) Inventor: Danielle Heaney, Secaucus, NJ (US)

( * ) Notice: Subject to any disclaimer, the term of this patent is extended or adjusted under 35 U.S.C. 154(b) by 247 days.

(21) Appl. No.: 15/444,515

(22) Filed: Feb. 28, 2017

(65) Prior Publication Data

US 2018/0242774 A1  Aug. 30, 2018

(51) Int. Cl.
*A47J 29/06* (2006.01)
*A47J 43/20* (2006.01)
*A47J 29/02* (2006.01)
*A23L 15/00* (2016.01)
*A23G 3/02* (2006.01)

(52) U.S. Cl.
CPC ............ *A47J 29/02* (2013.01); *A23G 3/0273* (2013.01); *A23L 15/00* (2016.08); *A47J 29/06* (2013.01); *A47J 43/20* (2013.01)

(58) Field of Classification Search
CPC .......... A47J 43/20; A47J 29/06; A23G 3/0273
USPC .......................................... 99/336, 440, 426
See application file for complete search history.

(56) References Cited

U.S. PATENT DOCUMENTS

| | | | |
|---|---|---|---|
| 211,859 A * | 2/1879 | Manley | 99/440 |
| 451,166 A * | 4/1891 | Bryant | 99/440 |
| 1,063,609 A * | 6/1913 | Shaw et al. | A47J 37/1295 126/273.5 |
| 1,517,432 A * | 12/1924 | Frank | A47J 29/06 211/181.1 |
| 1,623,093 A * | 4/1927 | Chapin | A47J 29/04 206/1.5 |
| 3,161,156 A * | 12/1964 | Batista | A23G 3/0273 220/23.4 |
| 3,757,674 A * | 9/1973 | Carroll | A47G 19/28 215/377 |
| 3,791,285 A * | 2/1974 | Mack | A47J 29/00 99/419 |
| 3,831,508 A * | 8/1974 | Wallard | A47G 19/28 220/573.1 |
| 4,617,860 A * | 10/1986 | Blaylock | A47J 43/20 426/523 |
| 6,591,738 B2 * | 7/2003 | Gabriel | G01K 3/04 374/E3.004 |
| 7,754,261 B2 * | 7/2010 | Stewart | A47J 43/18 426/300 |
| 2013/0112090 A1 * | 5/2013 | Costa | A47J 29/06 99/440 |

* cited by examiner

*Primary Examiner* — Reginald Alexander
(74) *Attorney, Agent, or Firm* — Tutunjian & Bitetto, P.C.

(57) ABSTRACT

An egg mold configured to create a hard-boiled egg made of egg whites only. The mold can be made of silicone and has at least one opening configured for receiving uncooked egg whites. The opening is closed and the mold is placed in boiling water with or without a stand designed for the same. Once cooked, the at least one opening or another means is provided to remove the hard-boiled egg white egg from the mold.

4 Claims, 6 Drawing Sheets

EGG WHITE MOLD

BACKGROUND

Technical Field

The present invention relate to hard-boiled eggs, and the preparation of the same. More particularly, it relates a mold for making hard boiled eggs made of egg whites only.

Related Art

At the present time there is no known method for making a hard-boiled egg that is made up exclusively of egg whites. Current egg "molds" are used for shaping a hard-boiled egg after the same has been cooked and to present the same in various shapes for kids and/or for presentation purposes. These shaped or molded hard-boiled eggs still have the yolk contained in the same.

With health and fitness being mainstream, some people prefer to eat their eggs without the yolks. As such, there is a need for a method for making hard-boiled eggs where the yolk has been eliminated from the same.

SUMMARY

According to an implementation, the hard-boiled egg white egg mold includes a base portion shaped like an egg and having an opening in a top thereof. A cap is configured to close the opening. The base portion is filled to the open top with egg whites. The cap closes the opening and the mold is placed in hot water to cook the egg whites. Once completed, the mold is removed from the boiling water and the egg white is removed from the mold.

According to another implementation, a system for making hard-boiled egg whites includes and egg mold and an egg mold stand configured to hold one of more of the egg molds within a pot of boiling water. The egg mold includes a base portion shaped like an egg and having an open top. A cap is configured to close the open top. The base portion is filled to the open top with egg whites. The cap closes the open top and the mold is placed in hot water into the stand.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which.

DETAILED DESCRIPTION

The present invention are directed to a silicone mold shaped like an egg and which is designed to allow the user to make a hard-boiled egg made exclusively of egg whites.

The present description illustrates the present invention. It will thus be appreciated that those skilled in the art will be able to devise various arrangements that, although not explicitly described or shown herein, embody the present invention and are included within its spirit and scope.

All examples and conditional language recited herein are intended for pedagogical purposes to aid the reader in understanding the present invention and the concepts contributed by the inventor(s) to furthering the art, and are to be construed as being without limitation to such specifically recited examples and conditions.

Moreover, all statements herein reciting invention, aspects, and embodiments of the present invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Reference in the specification to "one embodiment" or "an embodiment" or an "implementation" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

Figure 1:
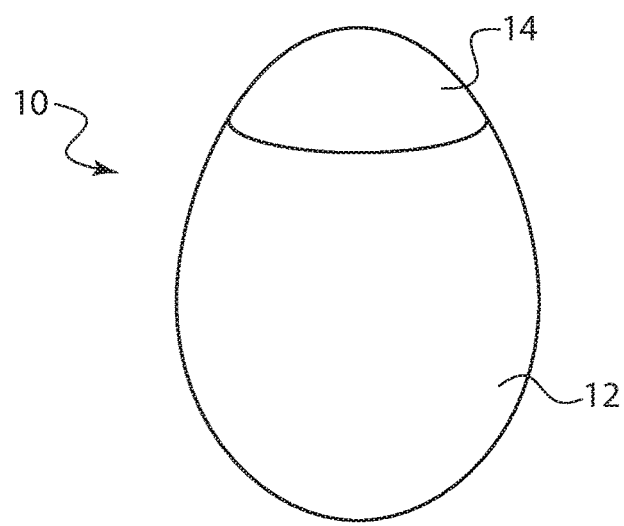
FIG. 1 is a top perspective view of the egg white egg mold according to an implementation of the present invention.
Figure 2:
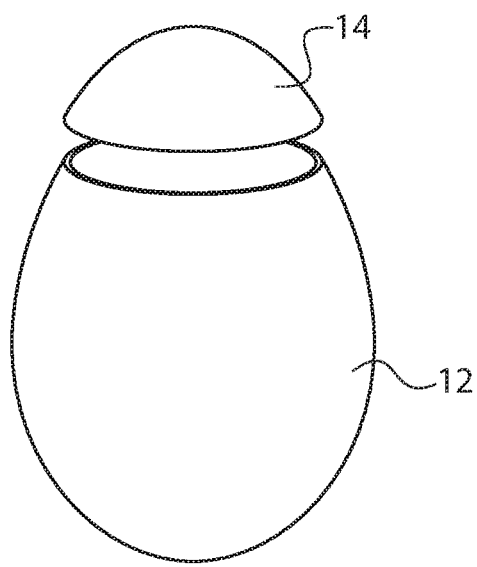
FIG. 2 is a top perspective view of the egg white mold with the top removed, according to an implementation of the present invention.
Figure 3:
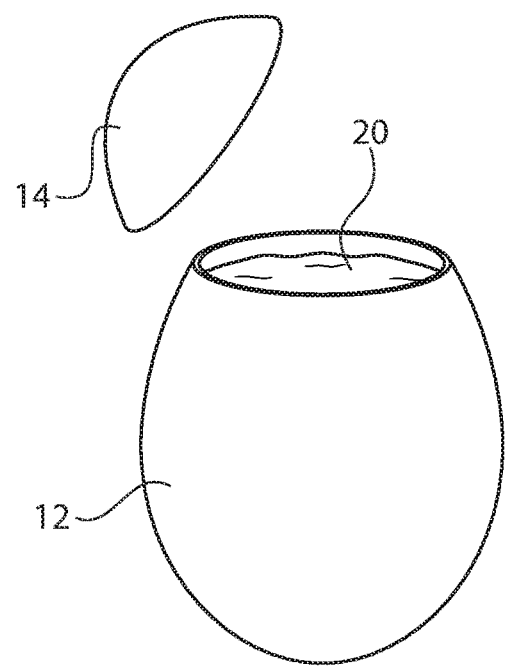
FIG. 3 is a top perspective view of the egg white mold showing the same filled, and prior to cooking, according to an implementation of the present invention.

Referring to FIGS. 1-3, there is shown the egg white mold 10 according to one implementation of the present invention. The mold 10 is preferably made out of silicone and includes a base 12 and a cap or lid 14. The cap 14 is removed, and the base is filled with egg whites 20 (FIG. 3). Once filled, the cap or lid 14 is replaced. As mentioned above, the preferred material for this mold 10 is silicone, however other materials could be used without departing from the intended scope and spirit of the present invention.

Figure 4A:
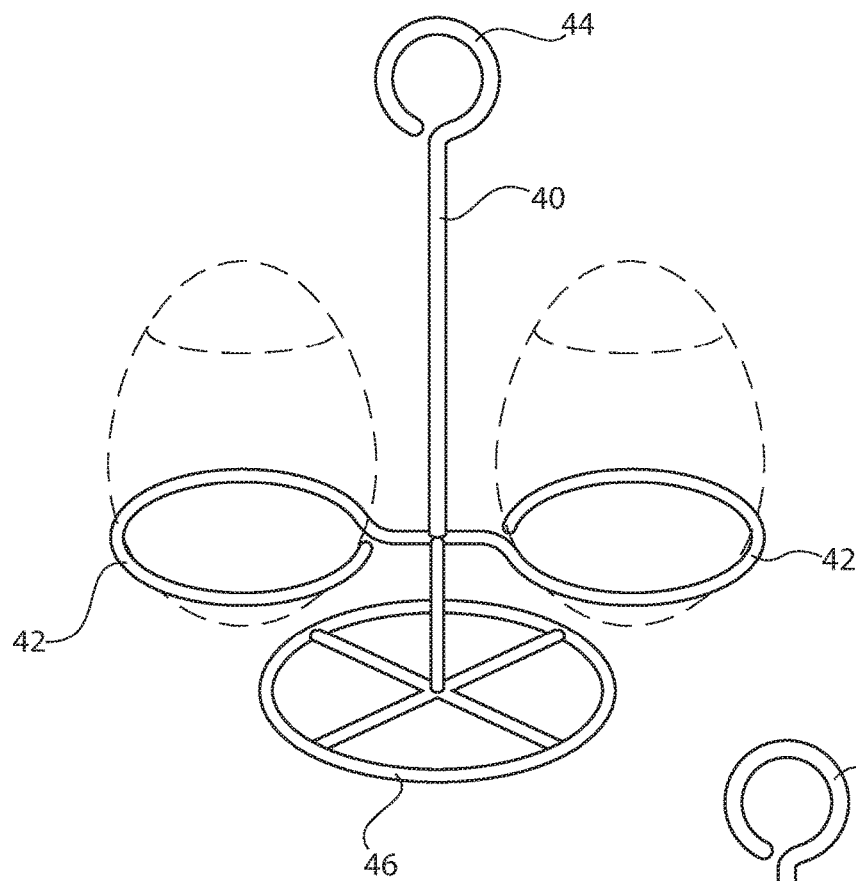
FIGS. 4A and 4B show variations in a holder to be used during cooking of the egg white mold, according to an implementation of the present invention.
Figure 4B:
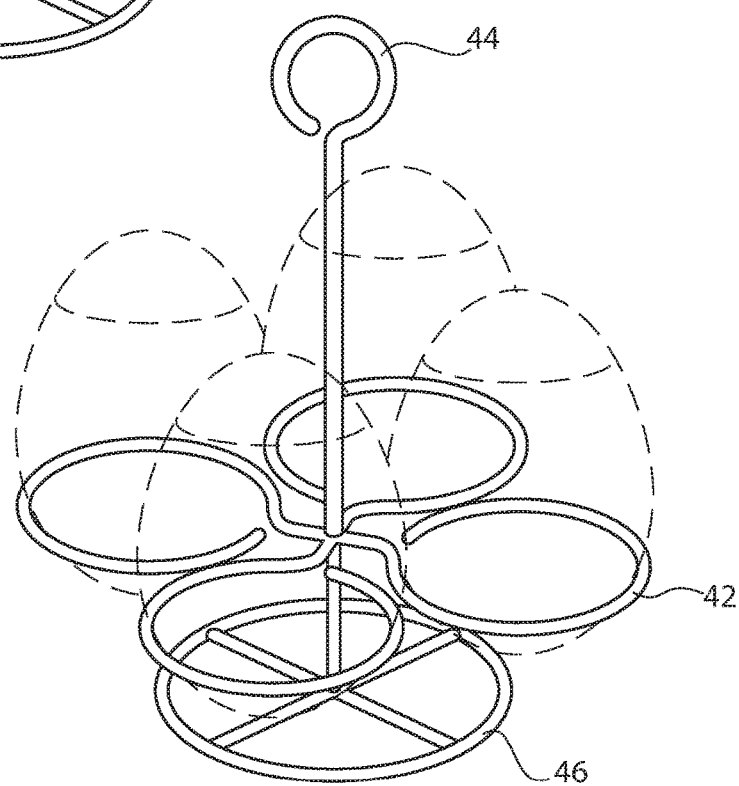
Figure 5:
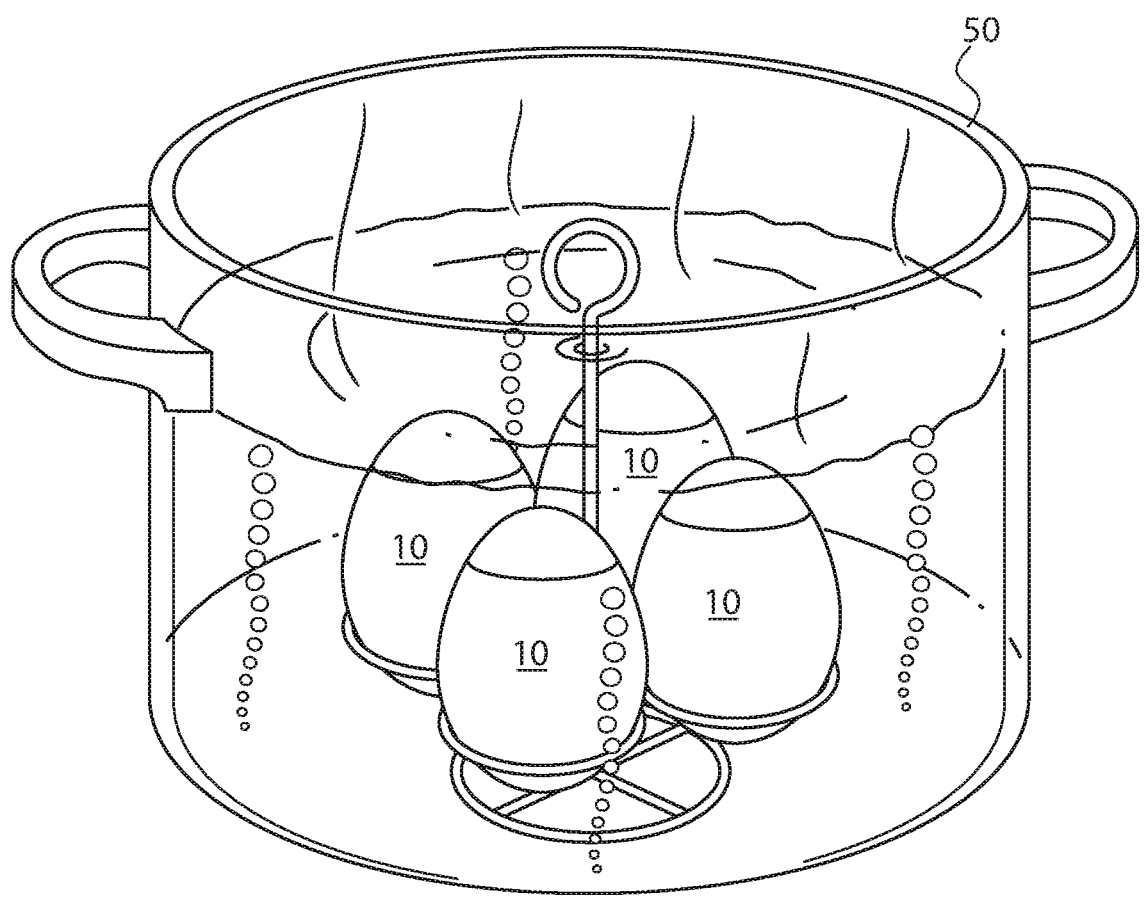
FIG. 5 is a schematic view of the cooking of the egg white hard-boiled eggs according to an implementation of the present invention.
Figure 6:
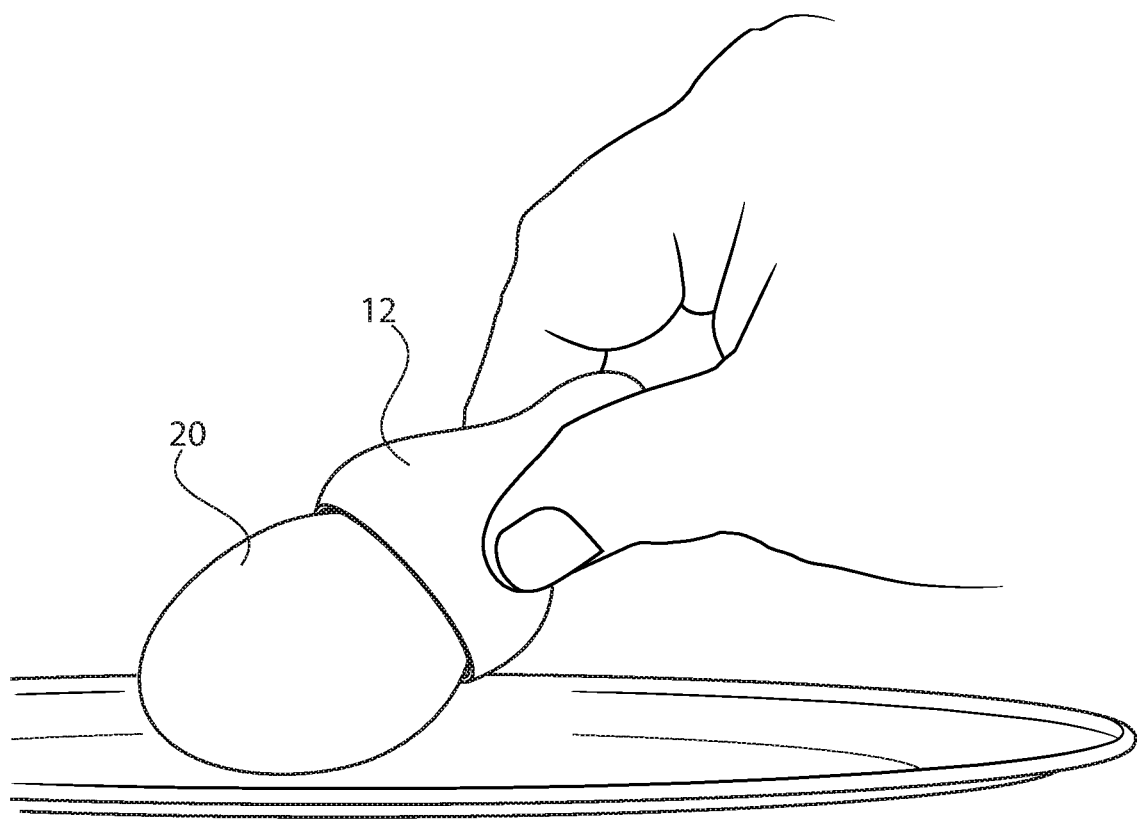
FIG. 6. is a schematic view of the removal of the hard-boiled egg white, according to an implementation of the present invention.

Referring to FIGS. 4A-5, one or more egg white molds 10 are then put onto a stand or rack 40. The stand 40 has a base 46 that rests on the bottom of the pot 50, and includes rings 42 for supporting the egg molds 10. The stand 40 operates to keep the molds 10 upright while the egg whites cook or set inside the mold. Those of skill in the art will appreciate that it is possible for the hard-boiled eggs can float at some point during the cooking stage. As such, the stand 40 will retain the egg whites until they set within the molds 10 (due to the hot water) and if they float at some point, they will be sufficiently set so that the cap 14 does not come off and/or egg leaches into the hot water. FIG. 6 shows how the hard-boiled egg whites 20 would be removed from the base 12 of the mold onto a plate, by the user pressing their fingers together and squeezing the cooked egg whites from the opening in the mold.

Figure 7:
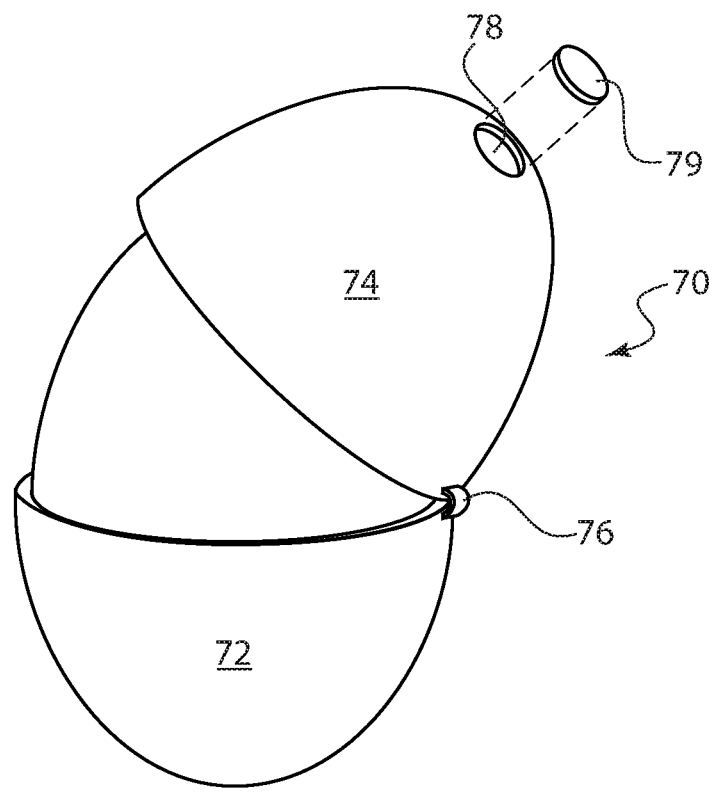
FIGS. 7-10B show alternative opening and filling mechanisms for the hard-boiled egg white mold, according to other implementations of the present invention.

FIG. 7 shows an alternative implementation of the mold 70 according to the present invention. In this arrangement the mold 70 is separated into two sections 72 and 74, hinged 76 or removably connected to each other. In this implementation, the separation between sections 72 and 74 is at a point of a largest diameter. A fill hole 78 with a cap 79 is provided. Thus, to use this mold 70, the two sections 72, and 74 are closed. The cap 79 is removed and the same is filled with egg whites. Once cooked, the hard-boiled egg white is removed by opening the two sections 72 and 74 as shown.

Figure 8A:
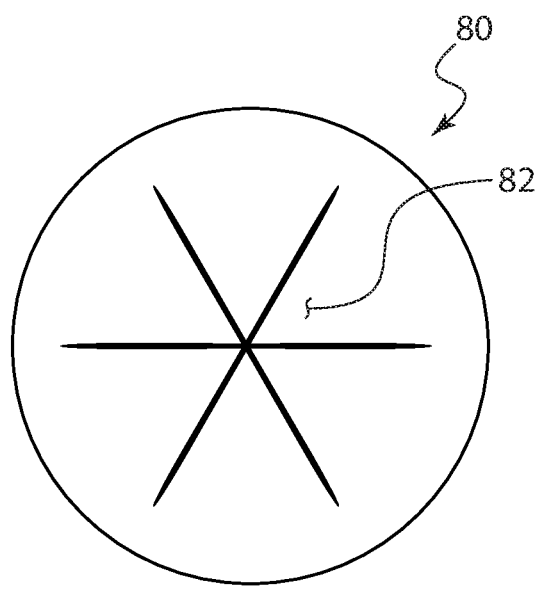
Figure 8B:
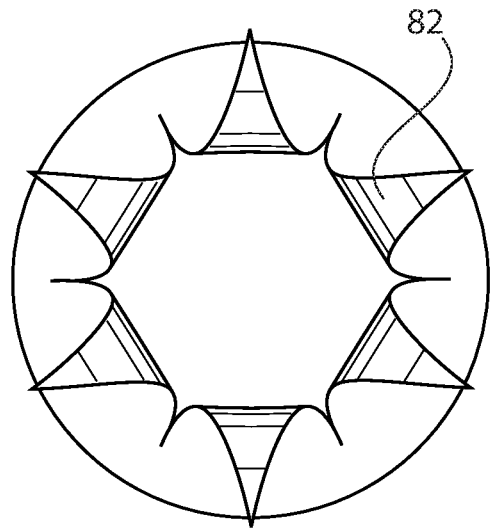
Figure 9A:
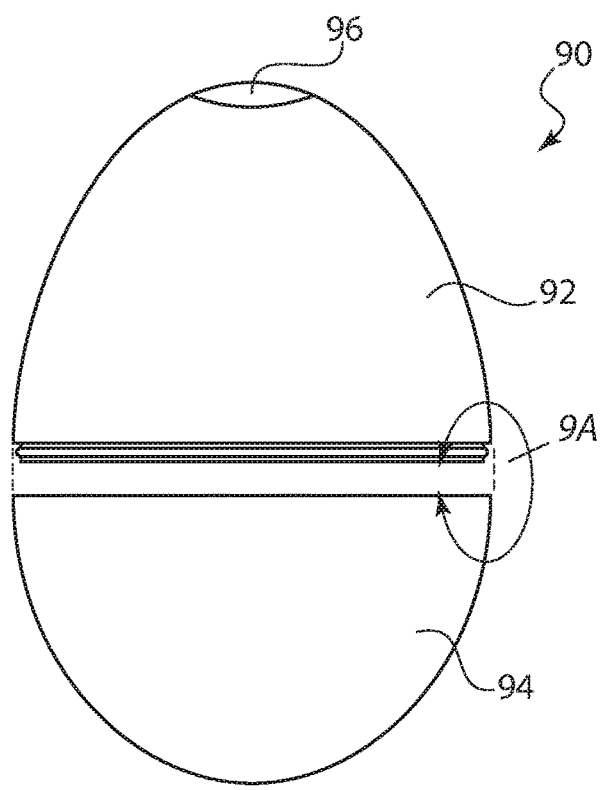
Figure 9B:
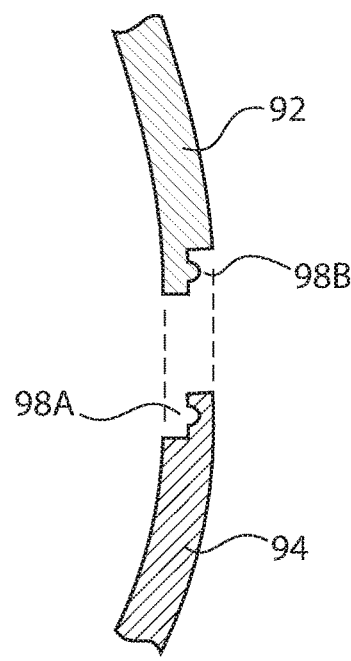
Figure 10A:
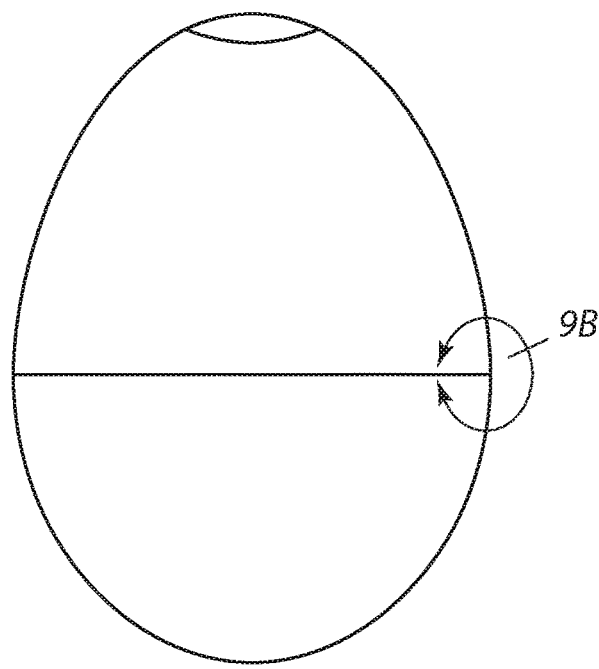
Figure 10B:
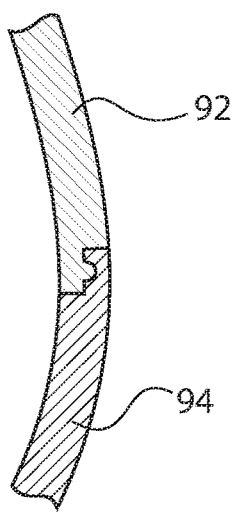

FIGS. 8A and 8B show another implementation of the egg mold 80 where the top is perforated in a star like or similar configuration. The wings 82 of the star are configured to be pulled back or spirally opened to fill the mold. Once the mold is filled with egg whites, the wings would fold back into their closed position (FIG. 8A).

FIGS. 9A-10B show another implementation of the egg mold 90 according to the present invention. Here, the two sections 92 and 94 are connected by a tongue (98B) and groove (98A) on the respective sections 92 and 94. This configuration allow the two sections 72 and 74 to "snap" fit into each other. A fill hole with cap 96 is provided at the top of this mold 90 to allow the filling of the same with egg whites and closure of the same before cooking.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

What is claimed is:

1. A hard-boiled egg white egg mold comprising:
    a silicone base portion shaped like an egg and having a closable opening in a top thereof, the opening being smaller than a largest width of the base portion and functioning as both a filling opening prior to cooking and a dispensing opening after cooking;
    the closable opening comprising star shaped perforations in the top portion, such that wings of the star can be opened and closed;
    wherein the base portion is filled to the open top with egg whites, the cap closes the opening and the mold is placed in hot water to cook the egg whites.

2. The egg mold according to claim 1, further comprising an egg mold holder configured to hold one or more egg molds within a pot of water.

3. A hard-boiled egg white egg mold comprising:
    a silicone egg mold comprising:
        a base portion shaped like an egg and having a top portion;
        a closable opening in said top portion that is integral with the base portion and configured to be both a filling opening prior to cooking and a dispensing opening after cooking, the opening being smaller than a widest part of the base portion and comprising star shaped perforations in the top portion such that wings of the start can be opened and closed;
    wherein the base portion is filled to the open top with egg whites, the opening is closed and the mold is placed in hot water to cook the egg whites, when the egg whites are cooked, the based portion is squeezed and the cooked egg whites are dispensed through the closable opening.

4. The egg mold according to claim 3, further comprising an egg mold holder configured to hold one or more egg molds within a pot of water.

* * * * *